United States Patent [19]

Parker

[11] 4,161,391

[45] Jul. 17, 1979

[54] MELTING APPARATUS

[75] Inventor: Herbert W. Parker, Chester, Va.

[73] Assignee: Allied Chemical Corporation, Morris Township, Morris County, N.J.

[21] Appl. No.: 886,704

[22] Filed: Mar. 14, 1978

[51] Int. Cl.² .......................... F27B 5/14; E01C 19/45
[52] U.S. Cl. .............................. 432/209; 126/343.5 A; 432/210
[58] Field of Search ............................... 432/209, 210; 126/343.5 A; 264/347

[56] References Cited

U.S. PATENT DOCUMENTS

| 2,217,743 | 10/1940 | Greenewalt | 425/441 |
|---|---|---|---|
| 2,253,176 | 8/1941 | Graves | 264/85 |
| 2,295,942 | 9/1942 | Fields | 264/85 |
| 2,300,083 | 10/1942 | Worthington | 126/343.5 A |
| 2,437,687 | 3/1948 | Dreyfus et al. | 264/176 F |
| 2,515,136 | 7/1950 | Pigott | 432/13 |
| 2,869,848 | 1/1959 | Dickie et al. | 432/198 |
| 2,877,495 | 3/1959 | Wegener et al. | 264/176 F |
| 2,916,262 | 12/1959 | Flores | 126/343.5 A |
| 3,180,630 | 4/1965 | Endres et al. | 126/343.5 A |
| 3,197,813 | 8/1965 | Le Grand | 432/219 |

FOREIGN PATENT DOCUMENTS

| 568127 | 12/1958 | Canada | 432/266 |
|---|---|---|---|
| 752665 | 7/1956 | United Kingdom | 432/266 |

OTHER PUBLICATIONS

Encyclopedia of Polymer Science and Technology, vol. 8, pp. 377-382 (1968).

*Primary Examiner*—John J. Camby
*Attorney, Agent, or Firm*—Richard A. Anderson

[57] ABSTRACT

Apparatus for melting solid particles of synthetic polymer is provided which features an enclosure in which at least one annular member and a heating unit are disposed. The heating unit zigzags in cross-section across the enclosure between the annular member and enclosure inlet. Jacket means substantially surrounds the enclosure at and downstream of a point corresponding to the heating unit. The annular member, heating unit, and jacket means are heated, preferably in series, to above the melt temperature of the solid synthetic polymer particles to provide melting surfaces for the polymer. The molten polymer is withdrawn through an outlet in the base of the enclosure.

10 Claims, 2 Drawing Figures

MELTING APPARATUS

BACKGROUND OF THE INVENTION

1. FIELD OF THE INVENTION

This invention relates to the melt-spinning of synthetic polymeric material and, more particularly, to apparatus for melting solid particles of synthetic polymer prior to extrusion.

2. DESCRIPTION OF THE PRIOR ART

Melt-spinning of synthetic polymeric material typically involves supplying the polymer in particulate or solid form to a melting device, from which the polymer is withdrawn in the molten state and forwarded, e.g., by a metering pump, to a spin pot assembly which includes a spinnerette through which molten polymer is extruded. Suitable melting devices are ordinarily either of the screw extrusion or heated element type, although other devices are known. The present invention is directed toward a melt vessel which contains heating elements.

The prior art is replete with various types of heating elements. The grid is a well known heating element and many alternative designs have been developed, e.g., perforated plates; ribs disposed in parallel vertically or horizontally; and flat spiral coils. The popular alternate to the use of the heated grid is the use of hollow heated members or fins which are disposed within the cavity of a melt vessel. These grids or hollow members are suitably heated so that polymer chip coming into contact therewith melts, to fall into a melt pool which has accumulated therebelow. It is also known to heat the wall or a portion thereof which forms the melt vessel.

In order to achieve increased production in the melt-spinning of synthetic polymers, the melting capacity of the melt vessel must be increased. Unfortunately, an increase in the cross-sectional area, and thus melting capacity, of the grid-type heating elements of the prior art necessitates a larger melt vessel. A larger melt vessel in turn increases both the risk of subjecting the polymer to differential heat profiles in the melt vessel and the risk of molten polymer degradation due to increased residence time. Therefore, it is desirable to achieve an expanded melting surface while restricting to a minimum expansion of the melt vessel itself.

It is also desirable to keep the rheological properties of the polymer at its point of withdrawal from the vessel as uniform as possible. To this end, the residence time of the molten polymer in the melt vessel should be as short as possible, and the temperature of all polymer contact portions of the melt vessel, including heating elements, should be as uniform as possible.

The melting apparatus of the present invention achieves all of these objectives, namely: increased melting capacity, more uniform melt temperatures, and improved polymer flow.

SUMMARY OF THE INVENTION

The present invention provides apparatus for melting solid particles of synthetic polymer. The essential elements are an enclosure, an inlet for introducing the solid particles of synthetic polymer to the enclosure, an outlet for withdrawal of the synthetic polymer in the molten state from the enclosure, at least one annular member, a heating unit, jacket means, and heating means. The annular member is supported in the interior of the enclosure in spaced apart relationship therewith. The heating unit is disposed within the enclosure between the annular member and the inlet. The heating unit, which has small spaces therethrough, has multiple zig-zags, such as in a triple "V" shape, in cross-section across the enclosure. The jacket means substantially surrounds the enclosure at and downstream of a point corresponding to the heating unit. Means is provided for heating the annular member, the heating unit, and jacket means, preferably in series, to above the melt temperature of the solid particles of synthetic polymer. The solid particles of synthetic polymer are introduced to the enclosure through the inlet, contact the heating unit where they melt, drop through the spaces, and flow down the heated surfaces provided by the interior of the enclosure and the annular member to exit at the outlet in the molten state.

The invention will be more clearly understood and additional objects and advantages will become apparent upon reference to the discussion below and to the drawings which are given for illustrative purposes.

DESCRIPTION OF THE PREFERRED EMBODIMENT

Figure 1:
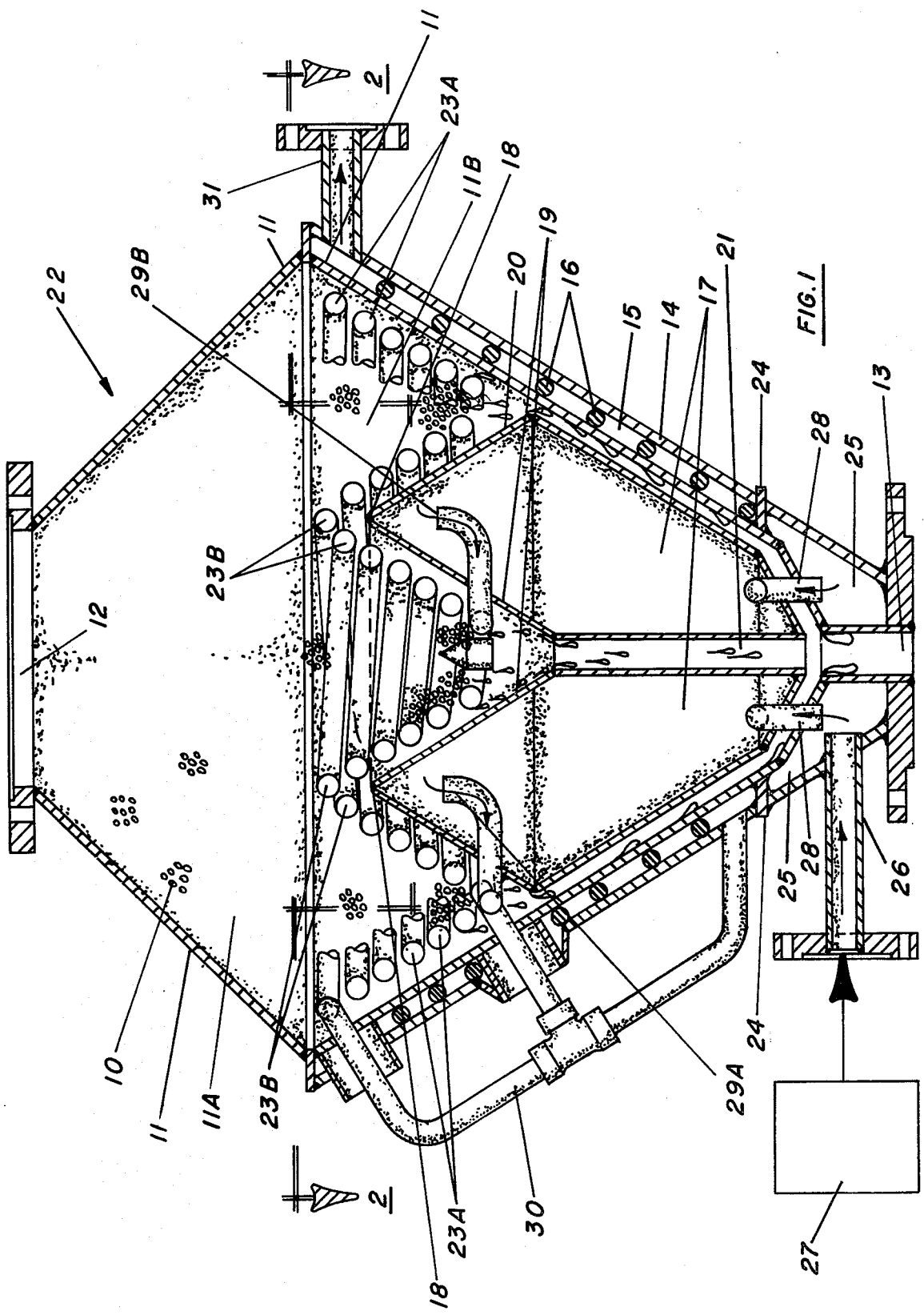
FIG. 1 is a vertical elevation cross-section of the melt apparatus comprising the present invention.

Referring to the drawings, wherein a preferred embodiment is illustrated in FIG. 1, like numbers indicate like apparatus. The major elements of the present invention are a vessel 22, jacket means 14, hollow annular member 17, and heating unit 23.

Vessel 22 has a substantially continuous wall 11 which diverges and then converges, in a base to base double frustoconical shape, to define, respectively, feed 11A and melt 11B areas. Inlet 12 is provided for introduction of solid particles of synthetic polymer 10, preferably in chip or flake form, to feed area 11A, and outlet 13 is provided for the withdrawal of the synthetic polymer 10 in the molten state from melt area 11B.

Jacket means 14 substantially surrounds vessel wall 11 at melt area 11B and forms two chambers 15 and 25 therebetween. Partition 24 separates chambers 15 and 25. Baffle means 16 is located in chamber 15 between jacket means 14 and vessel wall 11 and defines a hollow spiral passage through chamber 15. Baffle means 16 may be, as depicted, a rod which spirals through chamber 15 in contact with jacket means 14 and vessel wall 11.

Hollow annular member 17 is supported in the interior of melt area 11B in spaced apart relationship with vessel wall 11 and has an upstream ridge 18 formed by the intersection of the inner 19 and outer 20 surfaces of annular member 17 (see FIG. 1). Passageway 21, which has a flared upper opening, is formed by inner surface 19 of annular member 17 and is centered over outlet 13.

Figure 2:
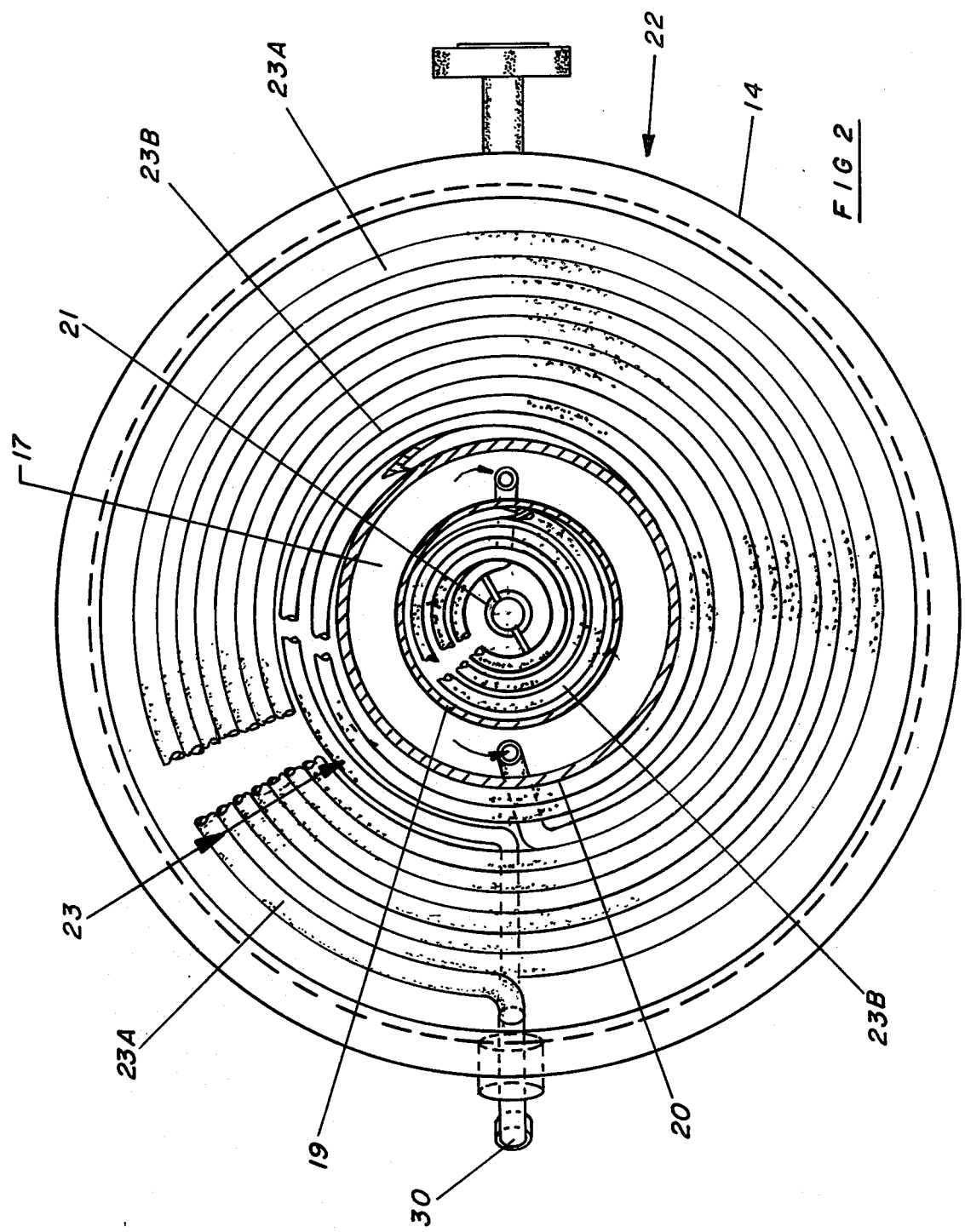
FIG. 2 is a cross-sectional view taken along the line 2—2 of FIG. 1.

With reference to FIGS. 1 and 2, heating unit 23 comprises a plurality of hollow, circular heating coils disposed within melt area 11B above annular member 17 and across vessel 22. FIG. 1 depicts the preferred embodiment wherein there are two circular heating coils 23A and 23B forming heating unit 23. Circular heating coil 23A is a continuous hollow coil which spirals to maintain a substantially uniform distance from vessel wall 11. Circular heating coil 23B is a continuous hollow coil which spirals to maintain a substantially uniform distance from inner 19 and outer 20 surfaces of annular member 17. Circular heating coils 23A and 23B together zigzag in cross-section across melt area 11B, small spaces being left between successive turns of each of heating coils 23A and 23B and their adjacent portions. FIG. 1 depicts the preferred embodiment wherein the cross-sectional multiple zigzagging of successive turns of circular heating coils 23A and 23B looks like a triple "V", the center "V" being disposed above passageway 21 and the outer "V's" being disposed between vessel wall 11 and outer surface 20 of annular member 17. Heating coils 23A and 23B are heated parallel to one another, preferably by circulating a heating fluid therethrough. The reason for heating the coils 23A and 23B in parallel is to reduce the pressure drop of the heating fluid and to provide a more uniform temperature across heating unit 23. This is necessitated by the increased melt surface and coil length provided by the cross-sectional multiple zigzagging of circular heating coils 23A and 23B. It should be noted that a single continuous coil can be utilized for heating unit 23.

Heating fluid, at a temperature exceeding the melt temperature of the synthetic polymer, is circulated through vessel 22 in the following manner. Heating fluid, preferably Dowtherm, is supplied from source 27 through fluid inlet 26 into chamber 25. Means 28 is provided for introducing the heating fluid into the interior of hollow annular member 17, at its base, from chamber 25. Means 28 may be, as depicted, two tubes leading from opposite sides of chamber 25 into the base of annular member 17. These tubes are preferably bent to discharge the heating fluid horizontally, with respect to the interior of annular member 17, and in a continuous, circular direction, to cause the heating fluid to swirl through the interior of annular member 17. This ensures a uniform temperature profile for all surfaces of annular member 17. Means 29A and 29B are provided for conveying the heating fluid from the interior of hollow annular member 17 near ridge 18 into, respectively, circular heating coils 23A and 23B. Means 29A and 29B may be, as illustrated, overflow pipes located on opposite sides of annular member 17. Means 30 is provided for conveying the heating fluid from circular heating coils 23A and 23B into the spiral passage at the base of chamber 15. Means 30 may be, as shown, a pipe system comprising a main pipe leading from circular heating coil 23A into the base of chamber 15 and a second pipe leading from circular heating coil 23B which tees into the main pipe. The heating fluid travels upwardly through the spiral passage defined by baffle means 16 in chamber 15 between jacket means 14 and vessel wall 11. Means 31, depicted in FIG. 1 as a fluid outlet, is provided for removing the heating fluid from chamber 15 after it has flowed through chamber 15.

The operation of the vessel is as follows. Heating fluid is continuously circulated through the vessel in the above-described fashion so that heating unit 23, the surfaces of annular member 17, and the interior of the vessel wall 11 in melt area 11B are heated to above the melt temperature of the synthetic polymer to be melted. Solid particles of synthetic polymer 10 are introduced to feed area 11A through inlet 12 from, e.g., a hopper connected thereto by a pipe line (both unshown). Feed of the synthetic polymer particles 10 is preferably by gravity, and is continuous in the sense that the solid particles are allowed to accumulate and backup. An inert gas, preferably nitrogen, is entrapped by the synthetic polymer particles 10 upstream of the vessel and forms an inert blanket at the point of melt within the vessel to minimize degradation through oxidation of the polymer. The synthetic polymer particles 10 contact the circular heating coils 23A and 23B comprising heating unit 23 in melt area 11B where they melt and drop through the spaces between successive turns of circular heating coils 23A and 23B. The polymer then flows down the sloping heated surfaces provided by vessel wall 11 in melt area 11B, outer surface 20 of annular member 17, and passageway 21 having a flared upper opening, to exit at outlet 13 in the molten state.

The cross-sectional multiple zigzagging of heating unit 23 (circular heating coils 23A and 23B) expands the melting surface initially encountered by the particulate polymer without a directly corresponding increase in the vessel size. Thus, the melting capacity of vessel 22 is increased. Also, the heating of circular heating coils 23A and 23B in parallel provides more uniform melt temperatures across heating unit 23, as explained previously.

Chambers 15 and 25, formed by jacket means 14 surrounding vessel wall 11 at melt area 11B, are both heated by circulation of heating fluid therethrough, as described previously. The function of baffle means 16 is to channel the circulation of heating fluid through chamber 15 so as to evenly heat vessel wall 11 adjacent thereto. With reference to FIG. 1, it can be seen that vessel wall 11 in melt area 11B is a molten polymer contact surface. By heating this transfer surface, the molten polymer is made more uniform for its exit from the melt vessel.

Hollow annular member 17 serves primarily two functions. First, it reduces the free volume of melt vessel 22 below heating unit 23 to decrease the residence time of the molten polymer. Second, due to the swirling action of the heating fluid circulating through the interior of annular member 17, all polymer contact surfaces of annular member 17 are uniformly heated. The shape and disposition of annular member 17 with respect to heating unit 23 and vessel wall 11 in melt area 11B in such that synthetic polymer which melts and drops through the spaces between heating coils 23A and 23B will subsequently contact a sloping heated surface at substantially the same point in its flow toward outlet 13. All polymer contact surfaces, i.e., vessel wall 11 in melt area 11B, inner 19 and outer 20 surfaces of annular member 17, the surface of annular member 17 defining passageway 21, and the remaining surfaces of annular member 17, are heated to a uniform temperature which is approximately the same as that of heating unit 23. This is achieved by circulating the heating fluid in the aforementioned manner. The rheological properties of the molten polymer at its point of withdrawal are thereby kept as uniform as possible. Other combinations of series and parallel flows are feasible. For example, heating fluid can be introduced from chamber 25 into the base of chamber 15 simultaneous with its introduction into the interior of hollow annular member 17. In this case, the heating fluid exiting from circular heating coils 23A and 23B would be conveyed directly, e.g., by a pipe, to fluid outlet 31 to be removed along with the heating fluid exiting from chamber 15.

In this disclosure, there is shown and described only the preferred embodiment of the invention, but it is to be understood that the invention is capable of other and different embodiments, and its several details are capable of various obvious modifications, all without departing from the inventive spirit thereof. It is intended that this invention be limited only as set forth in the following claims.

I claim:

1. Apparatus for melting solid particles of synthetic polymer comprising:
   (a) a vessel having a substantially continuous wall which diverges and then converges, in a base to base double frustoconical shape, to define, respectively, feed and melt areas;
   (b) an inlet for the introduction of said solid particles of synthetic polymer to said feed area;
   (c) an outlet for the withdrawal of said synthetic polymer in the molten state from said melt area;
   (d) jacket means substantially surrounding said wall at said melt area and forming a chamber therebetween;
   (e) baffle means, located in said chamber between said jacket means and said wall and defining a hollow spiral passage through said chamber;
   (f) a hollow annular member, supported in the interior of said melt area in spaced apart relationship with said wall, said annular member having an upstream ridge formed by the intersection of the inner and outer surfaces of said annular member, a passageway having a flared upper opening and being formed by said inner surface of said annular member being centered over said outlet;
   (g) a plurality of hollow, circular heating coils, disposed within said melt area above said annular member and across said vessel, said circular heating coils having small spaces between successive turns thereof and having multiple zigzagging of successive turns in cross-section across said melt area;
   (h) a source of heating fluid, said heating fluid being at a temperature greater than the melt temperature of said solid particles of synthetic polymer;
   (i) means for introducing said heating fluid into the interior of said hollow annular member at the base thereof;
   (j) means for conveying said heating fluid from said interior of said hollow annular member near said ridge into said circular heating coils;
   (k) means for conveying said heating fluid from said circular heating coils into said spiral passage in said chamber between said jacket means and said wall; and
   (l) means for removing said heating fluid from said chamber after said heating fluid has flowed through said chamber; whereby said solid particles of synthetic polymer are introduced to said feed area through said inlet, contact said circular heating coils in said melt area where they melt, drop through said spaces, and flow down the heated surfaces provided by said melt area wall, said outer surface of said annular member, and said passageway having a flared upper opening to exit at said outlet in the molten state.

2. The apparatus of claim 1 wherein said circular heating coils zigzag in a triple "V" shape with the center "V" being disposed above said passageway.

3. The apparatus of claim 1 wherein said heating fluid is Dowtherm.

4. Apparatus for melting solid particles of synthetic polymer comprising:
   (a) an enclosure;
   (b) an inlet for introducing said solid particles of synthetic polymer to said enclosure;
   (c) an outlet for withdrawal of said synthetic polymer in the molten state from said enclosure;
   (d) at least one annular member, supported in the interior of said enclosure in spaced apart relationship therewith;
   (e) a heating unit, disposed within said enclosure between said annular member and said inlet, said heating unit having multiple zigzags in cross-section across said enclosure and having small spaces therethrough;
   (f) jacket means substantially surrounding said enclosure at and downstream of a point corresponding to said heating unit, and
   (g) means for heating said annular member, said heating unit, and said jacket means to above the melt temperature of said solid particles of synthetic polymer.

5. The apparatus of claim 4 wherein said heating unit comprises a circular heating coil having small spaces between successive turns thereof.

6. The apparatus of claim 5 wherein said circular heating coil has a triple "V" shape in cross-section.

7. The apparatus of claim 4 wherein said annular member, said heating unit, and said jacket means are heated in series.

8. The apparatus of claim 7 wherein said means for heating comprises:
   (a) a source of heating fluid, said heating fluid being at a temperature greater than the melt temperature of said solid particles of synthetic polymer;
   (b) means for introducing said heating fluid into the interior of said annular member;
   (c) means for conveying said heating fluid from the interior of said annular member into said heating unit;
   (d) means for conveying said heating fluid from said heating unit into said jacket means; and
   (e) means for removing said heating fluid from said jacket means.

9. The apparatus of claim 8 wherein said heating fluid is Dowtherm.

10. The apparatus of claim 4 wherein there is one said annular member which is hollow and which has an upstream ridge formed by the intersection of the inner and outer surfaces of said annular member, a passageway having a flared upper opening being formed by said inner surface of said annular member being centered over said outlet.

* * * * *